United States Patent
Erickson et al.

(10) Patent No.: US 10,287,014 B2
(45) Date of Patent: May 14, 2019

(54) UNMANNED AERIAL VEHICLE COUPLING APPARATUS FOR DRONE COUPLING WITH VEHICLES

(71) Applicant: INTERNATIONAL BUSINESS MACHINES CORPORATION, Armonk, NY (US)

(72) Inventors: Thomas D. Erickson, Minneapolis, MN (US); Michael S. Gordon, Yorktown Heights, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/178,241

(22) Filed: Jun. 9, 2016

(65) Prior Publication Data
US 2017/0355459 A1 Dec. 14, 2017

(51) Int. Cl.
*B64C 39/02* (2006.01)
*B60L 11/18* (2006.01)
(Continued)

(52) U.S. Cl.
CPC ........ *B64C 39/024* (2013.01); *B60L 11/1822* (2013.01); *B60L 11/1824* (2013.01);
(Continued)

(58) Field of Classification Search
CPC ............ B64C 39/024; B64C 2201/042; B64C 2201/066; B60L 11/1822; B60L 11/1824;
(Continued)

(56) References Cited

U.S. PATENT DOCUMENTS 6,604,711 B1 * 8/2003 Stevens ................ B64C 39/024
244/135 A
6,868,314 B1 3/2005 Frink
(Continued)

FOREIGN PATENT DOCUMENTS

EP 2799336 A1 11/2014
EP 2963519 A1 1/2016
(Continued)

OTHER PUBLICATIONS

Anonymous, "German Researchers Land a Drone on a Moving Car," eeDesigIt.com, retrieved Mar. 2016. (pp. 1-2). Available at: http://www.eedesignit.com/video-of-the-day-german-researchers-land-a-drone-on-a-moving-car/.
(Continued)

*Primary Examiner* — Anne M Antonucci
*Assistant Examiner* — James E Stroud
(74) *Attorney, Agent, or Firm* — Tutunjian & Bitetto, P.C.; Rahan Uddin

(57) ABSTRACT

An unmanned aerial vehicle coupling apparatus for drone coupling. The unmanned aerial vehicle coupling apparatus includes a processor-based monitoring device to monitor values for each of a plurality of functions provided by a unmanned aerial vehicle and to detect when a value exceeds a predetermined threshold value, a vehicle selector to receive travel routes from each of a plurality of secondary vehicles and to select a secondary vehicle based on a travel route of the secondary vehicle when the value exceeds the predetermined threshold value, and a coupling mechanism to fasten and unfasten the unmanned aerial vehicle to the secondary vehicle.

15 Claims, 8 Drawing Sheets

(51) Int. Cl.
*B64D 27/24* (2006.01)
*B64D 3/00* (2006.01)
*G08G 5/00* (2006.01)
*G08G 1/00* (2006.01)
*G08G 5/02* (2006.01)
*B64F 5/40* (2017.01)

(52) U.S. Cl.
CPC ............... *B64D 3/00* (2013.01); *B64D 27/24* (2013.01); *B64F 5/40* (2017.01); *G08G 1/20* (2013.01); *G08G 1/205* (2013.01); *G08G 5/0039* (2013.01); *G08G 5/0056* (2013.01); *G08G 5/0069* (2013.01); *G08G 5/0091* (2013.01); *G08G 5/025* (2013.01); *B64C 2201/042* (2013.01); *B64C 2201/066* (2013.01)

(58) Field of Classification Search
CPC ......... B64D 3/00; B64D 27/24; B64F 5/0081; G05D 1/01; G08G 5/0069
USPC ............................................................ 701/3
See application file for complete search history.

(56) References Cited

U.S. PATENT DOCUMENTS

| | | | | |
|---|---|---|---|---|
| 6,889,941 B1* | 5/2005 | McElreath | ............. | B64D 39/00 244/135 A |
| 7,149,611 B2 | 12/2006 | Beck et al. | | |
| 7,798,449 B2* | 9/2010 | Small | .................... | B64C 39/024 244/1 TD |
| 8,056,860 B2* | 11/2011 | Small | .................... | B64C 39/024 244/1 TD |
| 8,301,326 B2 | 10/2012 | Malecki et al. | | |
| 9,056,676 B1* | 6/2015 | Wang | ........................ | B64F 1/00 |
| 9,187,099 B2 | 11/2015 | Powers et al. | | |
| 9,481,475 B2* | 11/2016 | Campillo | .............. | B64C 39/024 |
| 9,561,852 B1* | 2/2017 | Beaman | ................... | B64D 1/00 |
| 9,704,409 B2* | 7/2017 | Prakash | ................. | G08G 5/025 |
| 2004/0167682 A1 | 8/2004 | Beck et al. | | |
| 2009/0314883 A1 | 12/2009 | Arlton et al. | | |
| 2011/0068224 A1 | 3/2011 | Kang et al. | | |
| 2014/0124621 A1 | 5/2014 | Godzdanker et al. | | |
| 2015/0142250 A1 | 5/2015 | Cavender-Bares et al. | | |
| 2015/0370251 A1 | 12/2015 | Siegel et al. | | |

FOREIGN PATENT DOCUMENTS

| | | |
|---|---|---|
| WO | WO2008147681 A2 | 12/2008 |
| WO | WO2015067797 A1 | 5/2015 |

OTHER PUBLICATIONS

Anonymous, "Docking on the Fly," NovAtel.com, retrieved Mar. 2016. (pp. 1-3). Available at: http://www.novatel.com/tech-talk/velocity/velocity-2015/through-the-eyes-of-robots/docking-on-the-fly/.

Choi, J.Y. et al., "Collaborative Tracking Control of UAV-UGV," International Journal of Mechanical, Aerospace, Industrial, Mechatronic and Manufacturing Engineering, vol. 6, No. 11, Nov. 2012. (pp. 1-4).

Giakoumidis, N. et al., "Pilot-Scale Development of a UAV-UGV Hybrid with Air-Based UGV Path Planning," 10th International Conference on Frontiers of Information Technology (FIT), Dec. 2012. (pp. 1-5).

Mitra, S., "Autonomous Quadcopter Docking System," Cornell University, May 2013. (pp. 1-38).

Wu, S. et al., "Docking control of autonomous aerial refueling for UAV based on LQR," 10th IEEE International Conference on Control and Automation, Jun. 2013. (pp. 1-5).

* cited by examiner

UNMANNED AERIAL VEHICLE COUPLING APPARATUS FOR DRONE COUPLING WITH VEHICLES

BACKGROUND

Technical Field

The present invention relates generally to an unmanned aerial vehicle coupling apparatus and, in particular, to an unmanned aerial vehicle coupling apparatus for providing drone coupling with vehicles.

Description of the Related Art

An unmanned aerial vehicle (UAV), which is also commonly known as a drone, can provide various functions, including reconnaissance, combat, delivering cargo, and/or data collection (e.g., aerial photography). Unmanned aerial vehicles may travel long distances and/or expend battery life while performing these functions. However, limited battery life and/or unfavorable weather conditions may prohibit and/or limit the use of the unmanned aerial vehicle, which may inadvertently affect the efficiency and/or use of unmanned aerial vehicle for providing such functions.

SUMMARY

According to an aspect of the present principles, an unmanned aerial vehicle coupling apparatus is provided. The unmanned aerial vehicle coupling apparatus may include a processor-based monitoring device to monitor values for each of a plurality of functions provided by a unmanned aerial vehicle and to detect when at least one value exceeds a predetermined threshold value, a vehicle selector to receive travel routes from each of a plurality of secondary vehicles and to select at least one secondary vehicle based on a travel route of the at least one secondary vehicle when the at least one value exceeds the predetermined threshold value, and a coupling mechanism to fasten and unfasten the unmanned aerial vehicle to the at least one secondary vehicle.

According to another aspect of the present principles, a method for providing drone coupling is provided. The method may include detecting, by a processor-based monitoring device, values for each of a plurality of functions provided by a unmanned aerial vehicle and at least one value that exceeds a predetermined threshold value, receiving travel routes from each of a plurality of secondary vehicles, selecting at least one secondary vehicle based on a travel route of the at least one secondary vehicle when the at least one value exceeds the predetermined threshold value, and coupling the unmanned aerial vehicle to the at least one secondary vehicle.

According to another aspect of the present principles, a non-transitory computer readable storage medium for providing drone coupling is provided. The non-transitory computer readable storage medium may include a computer readable program for providing drone coupling, wherein the computer readable program, when executed on a computer, causes the computer to execute detecting, by a processor-based monitoring device, values for each of a plurality of functions provided by a unmanned aerial vehicle and at least one value that exceeds a predetermined threshold value, receiving travel routes from each of a plurality of secondary vehicles, selecting at least one secondary vehicle based on a travel route of the at least one secondary vehicle when the at least one value exceeds the predetermined threshold value, and coupling the unmanned aerial vehicle to the at least one secondary vehicle.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
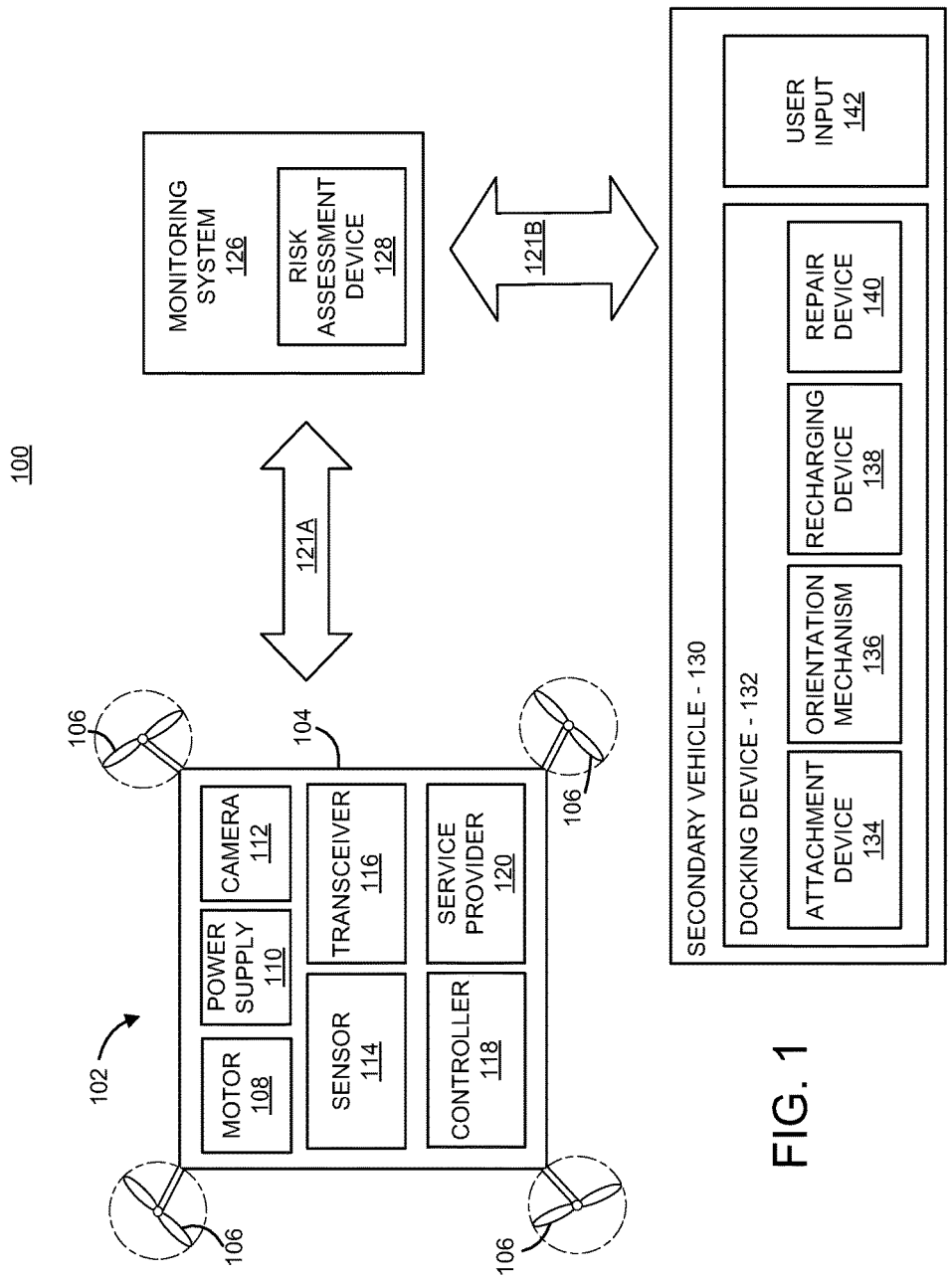
FIG. 1 is a block/flow diagram of an exemplary system for providing drone coupling between an unmanned aerial vehicle and a secondary vehicle, in accordance with an embodiment of the present principles.

The present principles are directed to systems and methods for providing drone coupling between an unmanned aerial vehicle and a secondary vehicle. In some embodiments, the present principles provide systems, methods and computer program products to facilitate interactions between an unmanned aerial vehicle and a secondary vehicle, such as autonomous and/or semi-autonomous vehicles, to determine and/or select a secondary vehicle based on a travel route, traveling conditions and/or service capabilities of the secondary vehicle. In some embodiments, the systems, methods and computer program products described herein may assess risk to the unmanned aerial vehicle and/or secondary vehicle for coupling and/or decoupling of the unmanned aerial vehicle to/from the secondary vehicle.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for providing drone coupling between an unmanned aerial vehicle 102 and a secondary vehicle 130 is illustratively depicted. It should be understood by one of ordinary skill in the art that the unmanned aerial vehicle 102 may comprise a drone, a drone-like unit, or a similarly functioning device. The secondary vehicle 130 may include an autonomous vehicle (e.g., a self-driving vehicle), a semi-autonomous vehicle, and/or similarly functioning devices.

In some embodiments, the unmanned aerial vehicle 102 may travel to and/or from a destination location, such as a shipping location, along a predetermined travel route. The unmanned aerial vehicle 102 may experience depletion of battery power from a power supply 110 and/or may traverse various environmental variables, such as rain, sleet, snow, hail, excessive wind, etc., which may be unsuitable and/or unsafe for aerial flight of the unmanned aerial vehicle 102.

In an embodiment, the system 100 may provide drone coupling between an unmanned aerial vehicle 102 and the secondary vehicle 130. For example, the unmanned aerial vehicle 102 may be configured to communicate with a monitoring system 126 to determine and/or detect a secondary vehicle 130 capable of providing services to the unmanned aerial vehicle 102, as will be described in further detail below. These services may include, but are not limited to, docking services, battery recharging services, battery replacement services, repair services, etc.

The monitoring system 126 may monitor one or more components/functions of the unmanned aerial vehicle 102 to determine if services of a secondary vehicle 130 are needed. For example, the monitoring system 126 may monitor values for each component of the unmanned aerial vehicle 102, such a power supply level of a power supply 110, rotational speed of one or more movement mechanisms 106, and/or functionality of a motor 108, camera 112, sensor 114, etc. In an embodiment, the monitoring system 126 may detect when at least one value exceeds a predetermined threshold value. For example, the predetermined threshold value may include a minimum value (e.g., 25 percent) of battery power for the power supply 110. In other embodiments, the predetermined threshold value may include a threshold value for speed (e.g., 30 rpm) of the movement mechanism(s) 106.

When the value exceeds the predetermined threshold value, the monitoring system 126 may transmit a request to a plurality of secondary vehicles 130 and receive availability for performing such services and/or location information for each of the secondary vehicles 130, such as a travel route and/or a global positioning coordinates. In some embodiments, the monitoring system 126 may transmit the request to a plurality of secondary vehicles 130 within a predetermined distance from the unmanned aerial vehicle 102. The predetermined distance may include, for example, a predetermined radius R from the unmanned aerial vehicle 102. The monitoring system 126 may be configured to select the secondary vehicle 130 from a plurality of secondary vehicles based on, for example, the travel route of the secondary vehicle 130. For example, the monitoring system 126 may request and/or receive travel routes for each of the plurality of secondary vehicles 130 and may select a secondary vehicle 130 when its respective travel route is substantially similar to the predetermined travel route of the unmanned aerial vehicle 102. In an alternate embodiment, the monitoring system 126 may select a secondary vehicle 130 traveling in the opposite and/or wrong direction if the components of the unmanned aerial vehicle 102 are critically low. For example, the monitoring system 126 may select a secondary vehicle 130 traveling in a direction dissimilar to the predetermined travel route of the unmanned aerial vehicle 102 if the monitoring system 126 determines that docking on the secondary vehicle 130 is more efficient than returning to another charging station based on the availability and location of other charging stations.

In a further embodiment, the unmanned aerial vehicle 102 may be configured to select the secondary vehicle 130 from a plurality of secondary vehicles based on, for example, a risk assessment level to the unmanned aerial vehicle 102, as will be described in further detail below. The monitoring system 126 may provide the unmanned aerial vehicle 102 with the location information of the selected secondary vehicle 130 such that the unmanned aerial vehicle 102 relocates to the location of the secondary vehicle 130 for coupling. Accordingly, the unmanned aerial vehicle 102 may couple to the secondary vehicle 130 without needing to stop travel for recharging, repair and/or unsuitable weather conditions.

In a further embodiment, the monitoring system 126 may receive a request from a secondary vehicle 130 for services of the unmanned aerial vehicle 102, such as bandwidth and/or encryption capabilities, which will be described in further detail below. The monitoring system 126 may transmit a request to a plurality of unmanned aerial vehicles 102 and receive availability for performing such services and/or location information for each of the unmanned aerial vehicles 102, such as a global positioning coordinates. The monitoring system 126 may be configured to select the unmanned aerial vehicle 102 from a plurality of unmanned aerial vehicles based on, for example, the travel route and/or capabilities of the unmanned aerial vehicle 102. The monitoring system 126 may provide the unmanned aerial vehicle 102 with the location information of the selected secondary vehicle 130 such that the unmanned aerial vehicle 102 relocates to the location of the secondary vehicle 10 for coupling. Accordingly, the unmanned aerial vehicle 102 may couple to the secondary vehicle 130 to provide various services.

The secondary vehicle 130 may have a docking device 132 mounted on the outside of the secondary vehicle 130 configured to attach to the unmanned aerial vehicle 102 and/or provide services to the unmanned aerial vehicle 102. For example, the docking device 132 may be mounted on the roof, hood, and/or trunk of the secondary vehicle 130. It should be understood that placement of the docking device 132 may be appropriately located so as to not interfere with a driver's field of view. In some embodiments, the secondary vehicle 130 is an autonomous vehicle where a driver's field of view is not of concern. The docking device 132 may include one or more attachment devices 134 (e.g., coupling mechanism), such as latches, hooks, magnets, etc., to temporarily couple (e.g., attach) the unmanned aerial vehicle 102 to the secondary vehicle 130. In an embodiment, the unmanned aerial vehicle 102 may include a coupling mechanism (not shown) to fasten and/or unfasten the unmanned aerial vehicle 102 to the secondary vehicle 130. In some embodiments, the secondary vehicle 130 may include a plurality of docking devices 132 to couple a plurality of unmanned aerial vehicles 102 to the secondary vehicle 130.

In an embodiment, the docking device 132 may include an orientation mechanism 136. The orientation mechanism 136 may be configured to adjust a landing surface of the docking device 132 and/or align the landing surface to the unmanned aerial vehicle 102 to provide a level landing area for the unmanned aerial vehicle 102. In some embodiments, the orientation mechanism 136 may rotate the docking device 132 and/or the landing area in an optimal manner with respect to wind direction. For example, the orientation mechanism 136 may rotate the docking device 132 and/or the landing area to reduce aerodynamic drag of the docking device 132 and/or to orient the movement mechanisms 106 of the unmanned aerial vehicle 102 towards oncoming wind, as will be described in further detail below. In some embodiments, the orientation mechanism 136 may include hydraulic devices and/or tilt mechanisms configured to tilt the landing surface of the docking device 132.

In some embodiments, the docking device 132 may include a recharging device 138, such as a wireless battery recharger and/or wired battery charger. In an embodiment, the recharging device 138 may be configured to perform inductive charging using an electromagnetic field to transfer energy between the secondary vehicle 130 and the unmanned aerial vehicle 102 such that the power supply 110 on the unmanned aerial vehicle 102 recharges. In another embodiment, the recharging device 138 may be configured to perform direct charging using wired connections between the secondary vehicle 130 and the unmanned aerial vehicle 102 such that the power supply 110 on the unmanned aerial vehicle 102 recharges. In another embodiment, the recharging device 138 may be configured to replace the power supply 110 on the unmanned aerial vehicle 102. For example, the recharging device 138 may be configured to remove the current power supply 110 and attach a new power supply 110 to the unmanned aerial vehicle 102. The new power supply 110 may be stored within a compartment (not shown) on or within the docking device 132.

In another embodiment, the docking device 132 may be configured to dock the unmanned aerial vehicle 102 in a position and/or adjust the position of the unmanned aerial vehicle 102 so as to utilize the unmanned aerial vehicle's 102 movement mechanisms 106 for recharging services (e.g., passive recharging). For example, the orientation mechanism 136 may adjust a position of the unmanned aerial vehicle 102 such that the propellers 106 are faced towards oncoming wind, thereby recharging the unmanned aerial vehicle 102. The unmanned aerial vehicle 102 may include an on-board transformer (not shown) for such passive recharging. The orientation mechanism 136 may include a rotational mechanism configured to rotate the docketing device 132 in 360 degrees such that the movement mechanisms 106 are positioned towards oncoming wind. Oncoming wind may include wind direction such that the movement mechanisms 106 are positioned toward the wind direction. In some embodiments, oncoming wind may include air flow caused by the forward movement of the secondary vehicle 130. For example, forward movement of the secondary vehicle 130 may provide air flow such that the movement mechanisms 106 are positioned toward the air flow.

The monitoring system 126 may assess various components of the unmanned aerial 102 to determine whether or not service by the secondary vehicle 130 is needed. For example, the monitoring system 126 may detect a battery level of the power supply 110 to determine if recharging and/or replacement is needed. In some embodiments, the monitoring system 126 may monitor a status of the movement mechanisms 106, motor 108, camera 112, sensor 114, etc. to determine if repair is needed. The monitoring system 126 may include a repair device 140 configured to perform repair services to the unmanned aerial vehicle 102 such as, but not limited to, repair or replacement of one or more movement mechanisms 106, motor 108, camera 112, sensor 114, central processing unit (CPU), global positioning system (GPS), and/or other electronics/components of the unmanned aerial vehicle 102.

In an embodiment, the monitoring system 126 may include a risk assessment device 128. The risk assessment device 128 may be configured to evaluate a level of risk associated with the unmanned aerial vehicle 102 and/or determine to couple the unmanned aerial vehicle 102 to the secondary vehicle 130. In some embodiments, the risk assessment device 128 may determine a level of risk to the unmanned aerial vehicle 102 due to one or more environmental variables, such as various weather conditions. The risk assessment device 128 may detect and/or receive information associated with the environmental variables traversed by the unmanned aerial vehicle, such as rain, sleet, snow, hail, excessive wind, etc., and determine the level of risk to the unmanned aerial vehicle 102. When the level of risk exceeds a predetermined threshold value, the monitoring device 126 may generate an instruction to couple the unmanned aerial vehicle 102 to a secondary vehicle 130 to reduce the risk to the unmanned aerial vehicle 102.

For example, excessive wind over 30 miles per hour (mph) may be unsuitable for aerial flight of the unmanned aerial vehicle 102. The risk assessment device 128 may determine a risk level to the unmanned aerial vehicle 102 based on the environmental variable(s). For example, the risk level to the unmanned aerial vehicle 102 may be 55 percent when the environmental variable is excessive wind exceeding 30 mph. Once the risk level to the unmanned aerial vehicle 102 exceeds a predetermined threshold value, the monitoring system 126 may further determine and/or select a secondary vehicle 130 for the unmanned aerial vehicle 102 to couple/dock to.

Accordingly, the unmanned aerial vehicle 102 does not have to delay travel due to recharging needs, repair needs and/or unsuitable environmental variables. The unmanned aerial vehicle 102 and/or monitoring system 126 may select optimal secondary vehicles 130, such as secondary vehicles 130 traveling along the predetermined travel route of the unmanned aerial vehicle 102. Coupling the unmanned aerial vehicle 102 on the secondary vehicle 130 may provide a safer and more efficient alternative to the unmanned aerial vehicle 102 to continue traveling towards its original predetermined destination compared to landing on a stationary platform (e.g., the ground, stationary base station, etc.) until unsafe environmental variables change and/or recharging/repair is completed. This is especially true if the secondary vehicle 130 is travelling in traffic or on streets at a slow rate of speed.

The unmanned aerial vehicle 102 may include a housing unit 104, at least one movement mechanism 106, and a motor 108 (e.g., internal combustion engine). The components of the unmanned aerial vehicle 102 may be affixed on the outside of the housing unit 104, or alternatively, may be enclosed within the housing unit 104 of the unmanned aerial vehicle 102.

In some embodiments, the at least one movement mechanism 106 may include a single propeller, a plurality of propellers, a propulsion mechanism, or similarly functioning devices. In one embodiment, the at least one movement mechanism may be powered by at least one motor 108 (e.g., internal combustion engine) and a power supply 110 to provide movement for the unmanned aerial vehicle. The power supply 110 may include a battery, such as a rechargeable battery, wind-charged battery and/or solar powered battery sufficient for powering the unmanned aerial vehicle 102 and/or components of the unmanned aerial vehicle 102.

Figure 4:
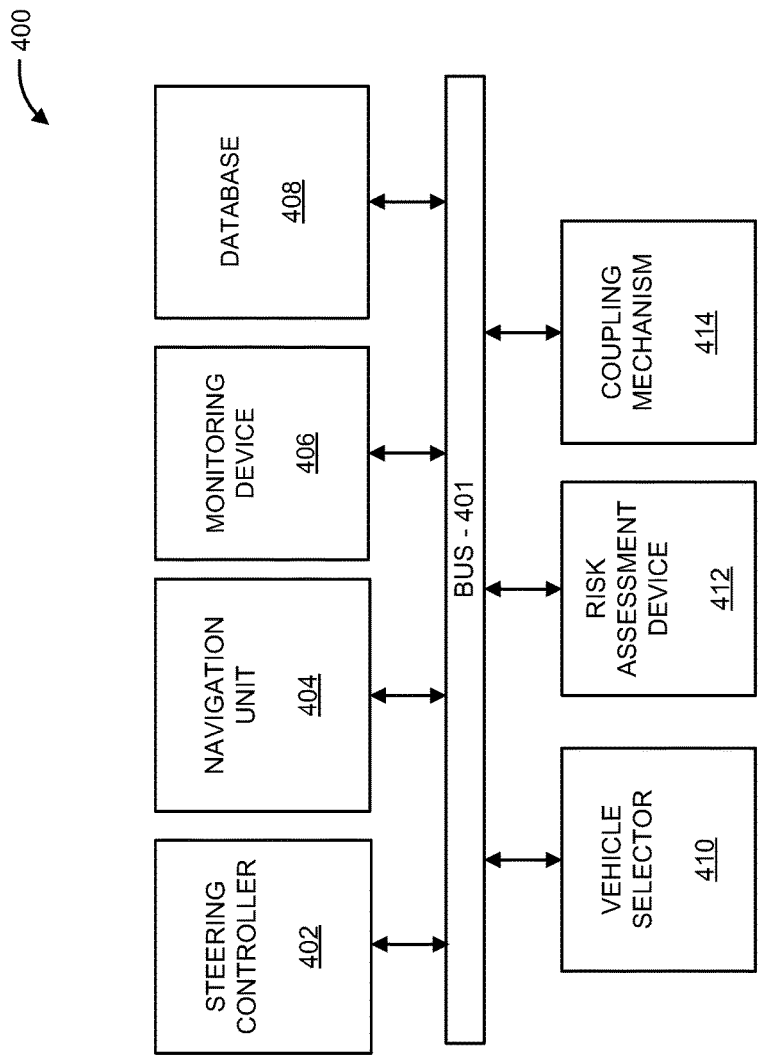
FIG. 4 is a block/flow diagram of an exemplary method for providing drone coupling between an unmanned aerial vehicle and a secondary vehicle, in accordance with an embodiment of the present principles.

In one embodiment, the movement mechanism 106 and/or motor 108 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 and/or motor 108 may be controlled by a steering controller 402, as illustrated in FIG. 4, to move the unmanned aerial vehicle 102 along three perpendicular axes, namely forward/backward movement, up/down movement, and left/right movement. In addition, the steering controller 402 may control the movement of the unmanned aerial vehicle in a 360 degree rotation, tilting forward/backward movement (e.g., pitching), swiveling left/right movement (e.g., yawing), and pivoting side to side movement (e.g., rolling).

In an embodiment, the movement mechanism(s) 106 and/or motor 108 provides movement for the unmanned aerial vehicle 102 to, for example, move the unmanned aerial vehicle 102 toward the one or more secondary vehicles 130. For example, the movement mechanisms 106 and/or motor 108 may provide movement for the unmanned aerial vehicle 102 such that the unmanned aerial vehicle 102 may be coupled to the secondary vehicle 130, as will be described in further detail below. In further embodiments, the movement mechanism(s) 106 and/or motor 108 provides movement for the unmanned aerial vehicle 102 to avoid collision between the unmanned aerial vehicle 102 and an object, such as a stationary and/or non-stationary object, a building, and/or other structures.

The unmanned aerial vehicle 102 may further include at least one camera 112. In an embodiment, the camera 112 may be configured to provide visual feedback of obstacles in the path of the unmanned aerial vehicle 102 for any purpose, such as, but not limited to, navigation guidance to the unmanned aerial vehicle 102. It should be understood that various types of cameras are contemplated, including night-vision enabled cameras, infrared sensing cameras, X-ray imaging devices, line scan imaging devices, high-definition cameras, video cameras, etc.

The camera 112 may be configured to provide visual feedback to the unmanned aerial vehicle 102, monitoring system 126, and/or secondary vehicle 130, including one or more still images and/or video feedback. In some embodiments, the camera 112 may be configured to recognize a secondary vehicle 130. For example, the camera 112 may capture still images and/or video feedback including one or more secondary vehicles 130 and/or monitor movement of the one or more secondary vehicles 130 which may be employed while the unmanned aerial vehicle 102 approaches the secondary vehicle 130 during landing and/or docking as the secondary vehicle 130 might be moving or stationary. The camera 112 may capture one or more still images or video images and, using a database, may perform image comparison with database images to detect the one or more secondary vehicles 130.

In yet a further embodiment, the camera 112 may be configured to detect and/or estimate one or more speeds of the one or more secondary vehicles 130. For example, the camera 112 may determine an approximate speed at which the one or more secondary vehicles 130 is traveling. Accordingly, each secondary vehicle 132 may be associated with a corresponding traveling speed. In some embodiments, the speed of the one or more secondary vehicles 130 may be employed to estimate and/or determine, for example, a risk level for the unmanned aerial vehicle 102 and/or which secondary vehicle 132 to couple to the unmanned aerial vehicle 102.

In some embodiments, the camera 112 may be placed on the unmanned aerial vehicle 102 such that the camera may provide visual feedback in 360 degrees on a horizontal plane and/or 360 degrees on a vertical plane of the unmanned aerial vehicle 102. In some embodiments, the camera 112 may include a plurality of cameras to provide visual feedback in all directions surrounding the unmanned aerial vehicle 102 such that there are no obscurations of the visual field (e.g., blind spots). In further embodiments, the camera 112 may be embedded within the housing unit 104 so as to prevent any negative effects to the aerodynamics of the unmanned aerial vehicle 102.

In an embodiment, the unmanned aerial vehicle 102 may include at least one sensor 114. The sensor 114 may include, but is not limited to, an acoustic sensor (e.g., microphone), a chemical sensor, an infrared sensor, an optical sensor, a collision avoidance sensor (e.g., a proximity sensor), a heat sensor, a vibration sensor, etc. In an embodiment, the sensor 112 may be configured to detect proximity to objects and/or obstacles in the path of the unmanned aerial vehicle 102 for any purpose such as, but not limited to, navigation guidance to the unmanned aerial vehicle 102. The sensor 112 may be configured to determine a distance between the unmanned aerial vehicle 102 and various objects, which may be employed during landing of the unmanned aerial vehicle 102 on the secondary vehicle 130.

In a further embodiment, the sensor 114 may be configured to detect and/or estimate one or more speeds of the secondary vehicle 130 and/or unmanned aerial vehicle 102. For example, the sensor 114 may determine an approximate speed at which the secondary vehicle 130 and/or unmanned aerial vehicle 102 is traveling. The approximate speeds may be employed, for example, in determining the risk level to the unmanned aerial vehicle 102, as will be described in further detail below.

The unmanned aerial vehicle 102 may include a transceiver 116 or similarly functioning device(s). In an embodiment, the transceiver 116 may be configured to communicate via transmission medium 121A with a monitoring system 126. The monitoring system 126 may include a processing device, such as a transceiver, to facilitate communications between the unmanned aerial vehicle 102 and a plurality of secondary vehicles 130. For example, the unmanned aerial vehicle 102 may transmit a request to the monitoring system 126 to determine available secondary vehicles 130 capable of providing various services. The monitoring system 126 may also communicate with a plurality of secondary vehicles 130 via transmission medium 121B to determine availability of the one or more secondary vehicles 130. In an alternate embodiment, the unmanned aerial vehicle 102 may include the monitoring system 126 such that the unmanned aerial vehicle 102 is configured to directly communicate with the plurality of secondary vehicles 130. In an alternate embodiment, the secondary vehicle 130 may include the monitoring system 126 such that the plurality of secondary vehicles 130 are configured to directly communicate with the unmanned aerial vehicle 102.

The transceiver 116, which may include a wireless module, may communicate with the wireless modules of other devices, allowing for the formation of a mesh network. The wireless module may include a low-power wireless transmitter, for example using a wireless protocol such as WirelessHART®, ZigBee®, Bluetooth®, 6LoWPAN, or Wi-Fi®, that connects to the wireless modules of additional devices. A mesh network is a multi-hop network wherein each unmanned aerial vehicle 102 and/or secondary devices 130 can be both a source and a relay communication node.

In some embodiments, the transceiver 116 may provide enhanced communication and/or encryption capabilities for the secondary vehicle 130. The transceiver 116 may provide communication and/or encryption capabilities for the secondary vehicle 130 when the unmanned aerial vehicle 102 is docked on the secondary vehicle 130. For example, a user (e.g., driver, passenger, etc.) of the secondary vehicle 130 may request via user input 142 a high bandwidth, encrypted video conference during its commute for which the secondary vehicle 130 and/or user's device (e.g., cellular telephone) may not be equipped.

The user input 142 may include one or more user input components to activate a communications module (e.g., transceiver 116) on the unmanned aerial vehicle 102 to provide communications for the secondary vehicle 130 when the unmanned aerial vehicle 102 is fastened to the secondary vehicle 130. The user may request from the monitoring system 126 an unmanned aerial vehicle 102 having such bandwidth and/or encryption capabilities to dock on the user's secondary vehicle 130 to provide the desired functionality for a portion and/or throughout the duration of the commute. For example, the transceiver 116 may be configured to provide a hotspot and/or a non-stationary device for providing the user with internet access. The transceiver 116 may be configured to perform such bandwidth and/or encryption capabilities to the user and/or secondary vehicle 130.

In some embodiments, different bandwidth and/or encryption capabilities may be needed by the user due to travel distance of the commute and/or interference along the commute. For example, the user may request via user input 142 an unmanned aerial vehicle 102 having a transceiver 116 for providing a higher and/or lower bandwidth. The monitoring system 126 may be configured to replace and/or "swap out" a current unmanned aerial vehicle 102 with a new unmanned aerial vehicle 102 configured to perform such higher and/or lower bandwidth. Accordingly, the monitoring system 126 may switch unmanned aerial vehicles 102 docked on the secondary vehicle 130 so as to provide sufficient bandwidth and/or encryption capabilities as requested by the user.

In some embodiments, the unmanned aerial vehicle 102 may be configured to dispense a reward to the secondary vehicle 130 when recharging and/or replacement of a component of the unmanned aerial vehicle 102 is complete. For example, the unmanned aerial vehicle 102 may transmit, via transceiver 116, a discount, rebate, coupon, reward points, payment, etc. for recharging and/or replacing the power supply 110. In an alternative embodiment, the unmanned aerial vehicle 102 may be configured to receive, via transceiver 116, a reward from the secondary vehicle 130 and/or docking device 132 for providing bandwidth and/or encryption capabilities. In some embodiments, the reward may be adjusted based on the need of the unmanned aerial vehicle 102 and/or secondary vehicle 130 to provide such services. For example, the reward may be increased when demand for recharging services is increased, such as when the power supply 110 on the unmanned aerial vehicle 102 is critically low versus when the power supply 110 is 50 percent depleted.

In a further embodiment, the unmanned aerial vehicle 102 may be configured to dispense a reward to the secondary vehicle 130 when the unmanned aerial vehicle 102 controls operations of the secondary vehicle 130. For example, the unmanned aerial vehicle 102 may include a controller 118 configured to control the operations of the secondary vehicle 130, such as speed and/or travel route of the secondary vehicle 130. For example, the controller 118 may limit the speed of the secondary vehicle 130 such that the secondary vehicle 130 does not exceed a predetermined speed which may cause damage to the unmanned aerial vehicle 102.

Similarly, the controller 118 may reroute and/or adjust the travel route of the secondary vehicle 130 such that the secondary vehicle 130 follows the predetermined route of the unmanned aerial vehicle 102. For example, the controller 118 may employ a navigation unit (not shown) of the unmanned aerial vehicle 102 instead of a navigation unit (not shown) of the secondary vehicle 130. In some secondary vehicles 130, such as autonomous and/or self-driving vehicles, operation of the secondary vehicle 130 may be controlled by a navigation unit rather than a driver. The controller 118 may be allowed to override the navigation unit of the secondary vehicle 130 such that the secondary vehicle 130 follows the predetermined route determined by the unmanned aerial vehicle 102. Accordingly, the transceiver 116 may dispense and/or receive a reward and/or incentive to/from the secondary vehicle 130 when the unmanned aerial vehicle 102 controls operations of the secondary vehicle 130. The unmanned aerial vehicle 102 may control various operations of the secondary vehicle 130 with appropriate safeguards in place, such as electronic handshaking and/or permission given between the unmanned aerial vehicle 1002 and secondary vehicle 130.

In an alternate embodiment, the reward provided by the unmanned aerial vehicle 102 to the secondary vehicle 130 may be in the form of a service provided. For example, the unmanned aerial vehicle 102 may include a service provider 120 configured to perform one or more services to the secondary vehicle 130. In an embodiment, the service provider 120 may include a cleaning device configured to clean (e.g., removal of debris) and/or wash various surfaces (e.g., hood, roof, trunk, etc.) of the secondary vehicle 130 in exchange for recharging and/or repair services provided by the secondary vehicle 130.

Figure 2:
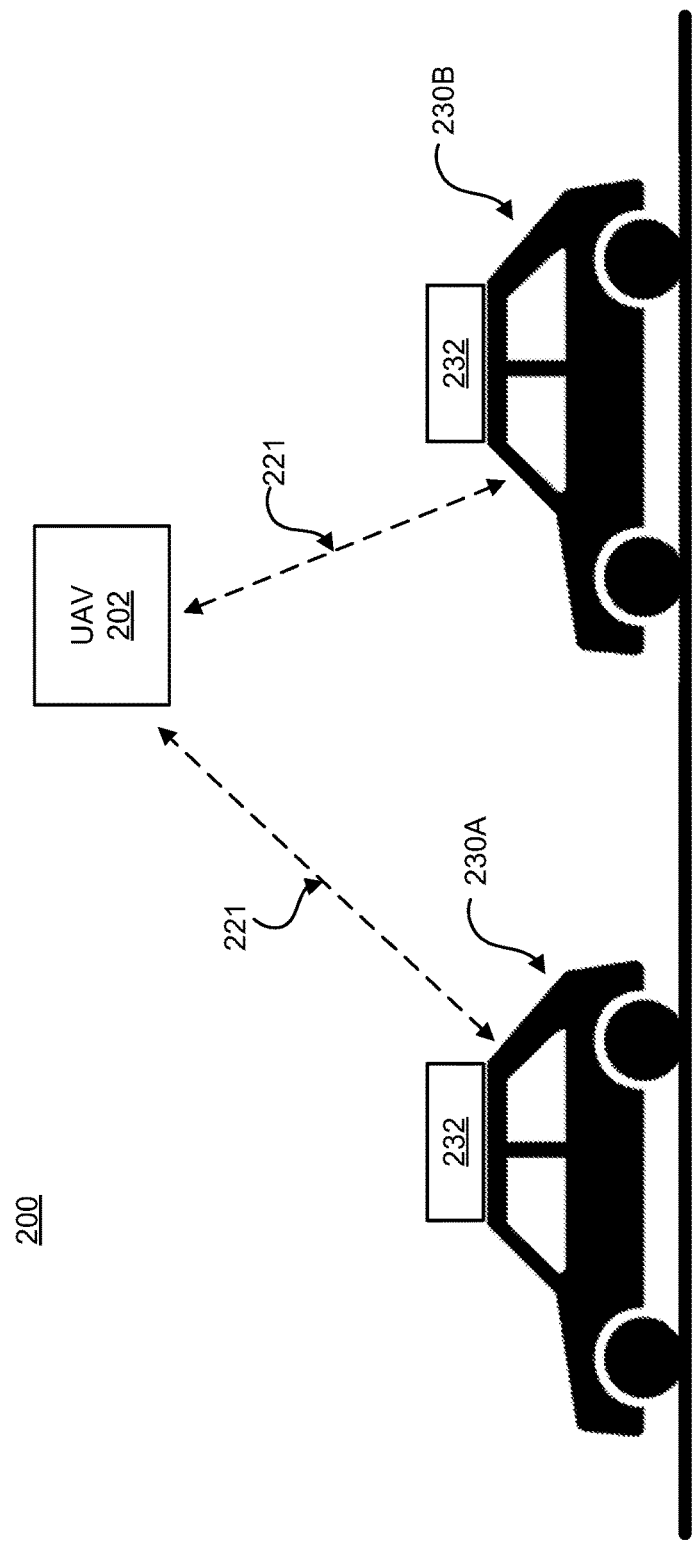
FIG. 2 is a block/flow diagram of an exemplary processing system for providing drone coupling between an unmanned aerial vehicle and a secondary vehicle, in accordance with an embodiment of the present principles.

Now referring to FIG. 2, an exemplary system/method 200 for providing drone coupling between an unmanned aerial vehicle 102 and a secondary vehicle 130 is illustratively depicted. The unmanned aerial vehicle (UAV) 202 may include any of system 100 of FIG. 1. As illustratively depicted in FIG. 2, the UAV 202 may be traveling along a predetermined travel route (e.g., northeast). Similarly, secondary vehicles 230A, 230B may be traveling along a respective travel route. For example, secondary vehicle 230A may have a travel route directed northeast while secondary vehicle 230B may have a travel route directed northwest.

In an embodiment, a monitoring system (not shown) of the UAV 202 may transmit a request via transmission medium 221 to secondary vehicles 230A, 230B for drone coupling. The monitoring system may request travel route information for each of the secondary vehicles 230A, 230B. Upon receipt of such travel route information, the monitoring system of UAV 202 may select an appropriate secondary vehicle 230A, 230B for drone coupling. For example, assuming the predetermined travel route of the UAV 202 is directed northeast, the monitoring system of the UAV 202 may transmit a request to secondary vehicle 230A for drone coupling based on the travel route information from the secondary vehicle 230A. If permitted by the secondary vehicle 230A, the UAV 202 may attach to secondary vehicle 230A via docking device 232, the docking device 232 being shown on the roof of the secondary vehicle 230A.

It is to be appreciated that system 300 described below with respect to FIG. 3, and system 400 described below with respect to FIG. 4, are systems for implementing respective embodiments of the present principles. Part or all of processing systems 100 and/or 200 may be implemented in one or more of the elements of system 300 of FIG. 3 and/or system 400 of FIG. 4. Further, it is to be appreciated that processing systems 100, 200, 300 and/or 400 may perform at least part of the method described herein, including, for example, at least part of method 500 of FIG. 5.

Figure 3:
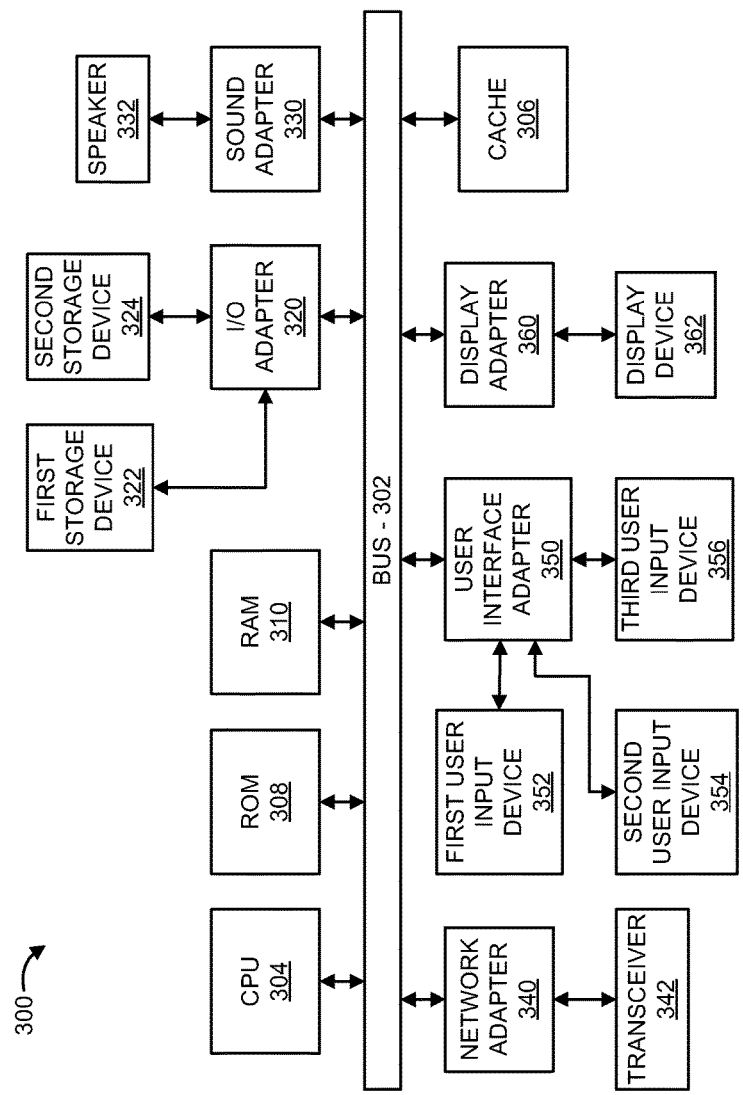
FIG. 3 is a block/flow diagram of an exemplary system for providing drone coupling between an unmanned aerial vehicle and a secondary vehicle, in accordance with an embodiment of the present principles.

Now referring to FIG. 3, with continued reference to FIGS. 1 and 2, an exemplary processing system 300 to which the present principles may be applied, in accordance with an embodiment, is illustratively depicted. The processing system 300 includes at least one processor, such as a computer processing unit (CPU) 304, operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360 are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, etc. The storage devices 322 and 324 can be the same type of storage device or different types of storage devices. In one embodiment, database images of images may be stored on the first storage device 322 and/or the second storage device 324 for comparison with images obtained by the camera 112 of FIG. 1.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any type of input device, including but not limited to, a keyboard, a mouse, a keypad, an image capture device, a motion sensing device, a microphone, a device incorporating the functionality of at least two of the preceding devices, and so forth. Other types of input devices can also be used while maintaining the spirit of the present principles. The user input devices 352, 354, and 356 can be the same type of user input device or different types of user input devices. The user input devices 352, 354, and 356 are used to input and output information to and from system 300.

The processing system 300 may also include other elements (not shown) or may omit some elements as shown. For example, various other input devices and/or output devices can be included in processing system 300 depending upon the particular implementation of the same, such as various types of wireless and/or wired input and/or output devices. Moreover, additional processors, controllers, memories and so forth, in various configurations, can also be utilized. These and other variations of the processing system 300 are readily contemplated.

Referring now to FIG. 4, with continued reference to FIGS. 1-3, an exemplary system 400 for providing drone coupling between an unmanned aerial vehicle 102 and a secondary vehicle 130 is illustratively depicted, in accordance with an embodiment of the present principles. The system 400 includes a steering controller 402, a navigation unit 404, a monitoring device 406, a database 408, a vehicle selector 410, a coupling mechanism 412, and/or an risk assessment device 414.

The steering controller 402 may be configured to control movement of the unmanned aerial vehicle 102. In one embodiment, the steering controller 402 may include a motor, such as motor 108 in FIG. 1. In some embodiments, the steering controller 402 may control the aerial movement of the unmanned aerial vehicle 102 by controlling the at least one movement mechanism 106 and/or motor 108 illustrated in FIG. 1.

In an embodiment, the steering controller 402 may be configured to control movement of the unmanned aerial vehicle 102 by controlling the rotational speed(s) and/or rotational direction(s) of each of the movement mechanisms 106 independently. For example, the steering controller 402 may be configured to rotate each of the movement mechanisms 106 in a single direction, or alternatively, the steering controller 402 may be configured to rotate each of the movement mechanisms 106 in opposing directions. In one embodiment, the steering controller 402 may be configured to control movement of the unmanned aerial vehicle 102 to move the unmanned aerial vehicle 102 to particular locations (e.g., locations of a secondary vehicle 130) and/or around/over difficult terrain and/or obstacles (e.g., trees, buildings, etc.).

In a further embodiment, the system 400 may include a navigation unit 404, such as a global positioning system (GPS). The navigation unit 404 may provide location information to the steering controller 402. For example, the navigation unit 404 may include map coordinates of a particular location, such as a location coordinates of one or more secondary vehicles 130, and may provide such information to the steering controller 402, such that the steering controller 402 may direct the unmanned aerial vehicle 102 to the particular location of one or more secondary vehicles 130.

In an embodiment, the system 400 may include a monitoring device 406. The monitoring device 406 may include a camera, a sensor, a transceiver, a processing device or similarly functioning devices to monitor one or more unmanned aerial vehicles 102 and/or secondary vehicles 130. For example, the monitoring device 406 may be configured to monitor values for each of a plurality of functions and/or one or more components of the unmanned aerial vehicle 102 and/or secondary vehicle 130 to determine if services of the unmanned aerial vehicle 102 and/or secondary vehicle 130 are needed. For example, the monitoring device 406 may monitor a power supply level of the power supply 110 on the unmanned aerial vehicle 102 and/or operating status of the motor 108, movement mechanism 106, camera 112, sensor 114, etc. When a value of a function and/or a component of the unmanned aerial vehicle 102 exceeds a predetermined threshold value, the monitoring device 406 may transmit a request to a vehicle selector 410 to select an optimal secondary vehicle 130.

The vehicle selector 410 may receive various information relating to a plurality of secondary vehicles 130, such as travel route information, availability for performing services, and/or location information for each of the secondary vehicles 130 (e.g., global positioning coordinates). The vehicle selector 410 may be configured to select the secondary vehicle 130 from a plurality of secondary vehicles based on, for example, the travel route of the secondary vehicle 130 and proximity to the unmanned aerial vehicle 102. For example, the vehicle selector 410 may request and/or receive travel routes for each of the plurality of secondary vehicles 130 and may select a secondary vehicle 130 when its respective travel route is similar to the predetermined travel route of the unmanned aerial vehicle 102. The vehicle selector 410 may provide the unmanned aerial vehicle 102 with the location information of the selected secondary vehicle 130 such that the unmanned aerial vehicle 102 relocates to the location of the secondary vehicle 130 for coupling.

In an embodiment, the monitoring device 406 and/or vehicle selector 410 may be configured to receive a request from one or more secondary vehicles 130 for services of an unmanned aerial vehicle 102, such as bandwidth and/or encryption capabilities. The vehicle selector 410 may transmit a request to a plurality of unmanned aerial vehicles 102 and receive availability for performing such services and/or location information for each of the unmanned aerial vehicles 102, such as a global positioning coordinates. The vehicle selector 410 may be configured to select the unmanned aerial vehicle 102 based on, for example, the travel route of the unmanned aerial vehicle 102. The vehicle selector 410 may provide the unmanned aerial vehicle 102 with the location information of the selected secondary vehicle 130 such that the unmanned aerial vehicle 102 relocates to the location of the secondary vehicle 10 for coupling.

In an embodiment, a list of unmanned aerial vehicles 102 and/or secondary vehicles 130 may be stored in database 408. The database 408 may store information relating to identification, location, travel route, traveling speed, pricing, demand, reliability, and/or security associated with each unmanned aerial vehicle 102 and/or secondary vehicle 130, and/or a list of services needed by or available to the unmanned aerial vehicle 102 and/or secondary vehicle 130. In an embodiment, the vehicle selector 410 may periodically update such information stored in database 408. For example, reliability may involve such considerations including, but not limited to, reliably of a secondary vehicle 130 to reach a destination in certain amount of time based on a condition of secondary vehicle 130, age of the secondary vehicle 130, travel plans of a driver of the secondary vehicle 130, speed of the driver, driver habits over the past N minutes of driving, amount of gas in the secondary vehicle 130, etc. Similar considerations deal with security in the sense of physical security, such as whether or not the unmanned aerial vehicle has ever been stolen, fallen off, been tampered with, etc., while being docked on a particular secondary vehicle 130. In some embodiments, security may also refer to a method of "docking" on the car. For example, some docking devices may be more secure in the sense of holding the unmanned aerial vehicle 102 most effectively, positioning the unmanned aerial vehicle 102 such that it is not unduly buffeted by wind, etc. The release mechanism (e.g., attachment device 134) and assessment algorithm may also relate to reliability or security, and different secondary vehicles 130 may have different release mechanisms (both hardware and software operated).

In some embodiments, the vehicle selector 410 may be configured to optimize the selection of the unmanned aerial vehicle 102 and/or secondary vehicle 130 based on such stored information. For example, the vehicle selector 410 may select a secondary vehicle 130 based on location information and travel route, such as a secondary vehicle 130 traveling in the same direction and nearby to the unmanned aerial vehicle 102. In some embodiments, optimizing the selection of the secondary vehicle 130 may also include improving the probability of reaching a destination, or getting closer to a certain destination, in a certain amount of time. In a further embodiment, the vehicle selector 410 may optimize the selection of a secondary vehicle 130 by assessing one or more variables of the secondary vehicle 130, such as condition of the secondary vehicle 130.

For example, consider several possible target secondary vehicles 130 for an unmanned aerial vehicle 102. The unmanned aerial vehicle 102 wishes to arrive at a particular destination by 3:00 pm. Assume secondary vehicle 130 (e.g., Car 1) is travelling to destination that is close to the particular destination requested by the unmanned aerial vehicle 102, and that Car 1 has been very reliable in the past for reaching destinations in an efficient manner. Car 2 (e.g., secondary vehicle 130) has an unknown destination, but it is traveling North. Car 3 (e.g., secondary vehicle 130) is travelling towards the particular destination of the unmanned aerial vehicle 102, but Car 3 is a very old car, low on gas, carrying a large sofa strapped to the roof, and travelling at 30 mph. Car 4 (e.g., secondary vehicle 130) is willing to be fully commanded (e.g., controlled) by the unmanned aerial vehicle 102 for the next 15 minutes and travel as the unmanned aerial vehicle 102 commands it to travel. In addition, assume Car 4 also has snow tires and is using up-to-date software, thereby enabling faster communications, relatively error-free, and relatively free of viruses.

Based on an assessment algorithm, the vehicle selector 410 may choose Car 1 or Car 4, since they are more likely to be of most use in reaching the particular destination. Similarly, the secondary vehicle 130 may assess the unmanned aerial vehicle 102 based on its security and reliability, preferring to accept drones with safe or known characteristics, that are running at certain software levels, that have certain safety or navigation features, that have reliable communicating features, that have collision-avoidance features, that are free of viruses, etc.

In a further embodiment, the vehicle selector 410 may be configured to identify the unmanned aerial vehicle 102 and/or secondary vehicle 130. For example, the monitoring device 406 may be configured to capture one or more still images and/or video of a secondary vehicle 130 and, using image comparison with images stored in the database 408, the vehicle selector 410 may be configured to identify the selected secondary vehicle 130. Accordingly, the vehicle selector 410 may be configured to distinguish a selected secondary vehicle 130 from a plurality of vehicles. For example, the monitoring device 406 may include an optical sensor configured to detect an identification indicator (e.g., barcode, quick-response code, etc.) located on the secondary vehicle 130.

The system 300 may further include a risk assessment device 310. The risk assessment device 310, which may include one or more processors, may be configured to evaluate a level of risk associated with the unmanned aerial vehicle 102 and/or secondary vehicle 130. In some embodiments, the risk assessment device 310 may determine a level of risk to the unmanned aerial vehicle 102 due to one or more environmental variables, such as various weather conditions. The risk assessment device 310 may detect and/or receive information associated with the environmental variables, such as rain, sleet, snow, hail, excessive wind, etc., and determine the level of risk to the unmanned aerial vehicle 102. In an embodiment, the risk assessment device 310 may determine a risk level to the secondary vehicle 130 due to, for example, drag and/or negative impacts to aerodynamics due to coupling the unmanned aerial vehicle 102 to the secondary vehicle 130. When the risk level exceeds a predetermined level, the monitoring device 406 may generate an instruction to disengage and/or unfasten the unmanned aerial vehicle 102 from the secondary vehicle 130.

In an embodiment, the monitoring device 406 may detect and/or monitor the traveling speed of the secondary vehicle 130 when the unmanned aerial vehicle 102 is coupled to the secondary vehicle 130. The risk assessment device 410 may determine a level of risk to the unmanned aerial vehicle 102 based on the traveling speed of the secondary vehicle 130, as excessive speeds may cause damage to the unmanned aerial vehicle 102. If the level of risk exceeds a predetermined threshold value, the monitoring device 406 may generate an instruction to disengage the unmanned aerial vehicle 102 from the secondary vehicle 130 to prevent damage to the unmanned aerial vehicle 102 and/or secondary vehicle 130. In a further embodiment, the monitoring device 406 may generate an instruction to the secondary vehicle 130 to reducing speed when the unmanned aerial vehicle 102 couples to and/or disengages from the secondary vehicle so as to avoid speed-related damage to the unmanned aerial vehicle 102 and/or secondary vehicle 130.

The system 400 may further include a coupling mechanism 414 configured to couple and/or disengage the unmanned aerial vehicle 102 to/from the secondary vehicle 130. The coupling mechanism 414 may include one or more attachment devices, such as latches, hooks, magnets, etc., to temporarily couple (e.g., attach) the unmanned aerial vehicle 102 to the secondary vehicle 130.

In the embodiment shown in FIG. 4, the elements thereof may be interconnected by a bus 401. However, in other embodiments, other types of connections can also be used. Moreover, in an embodiment, at least one of the elements of system 400 is processor-based. Further, while one or more elements may be shown as separate elements, in other embodiments these elements can be combined as one element. These and other variations of the elements of system 400 are readily determined by one of ordinary skill in the art, given the teachings of the present principles provided herein.

Figure 5:
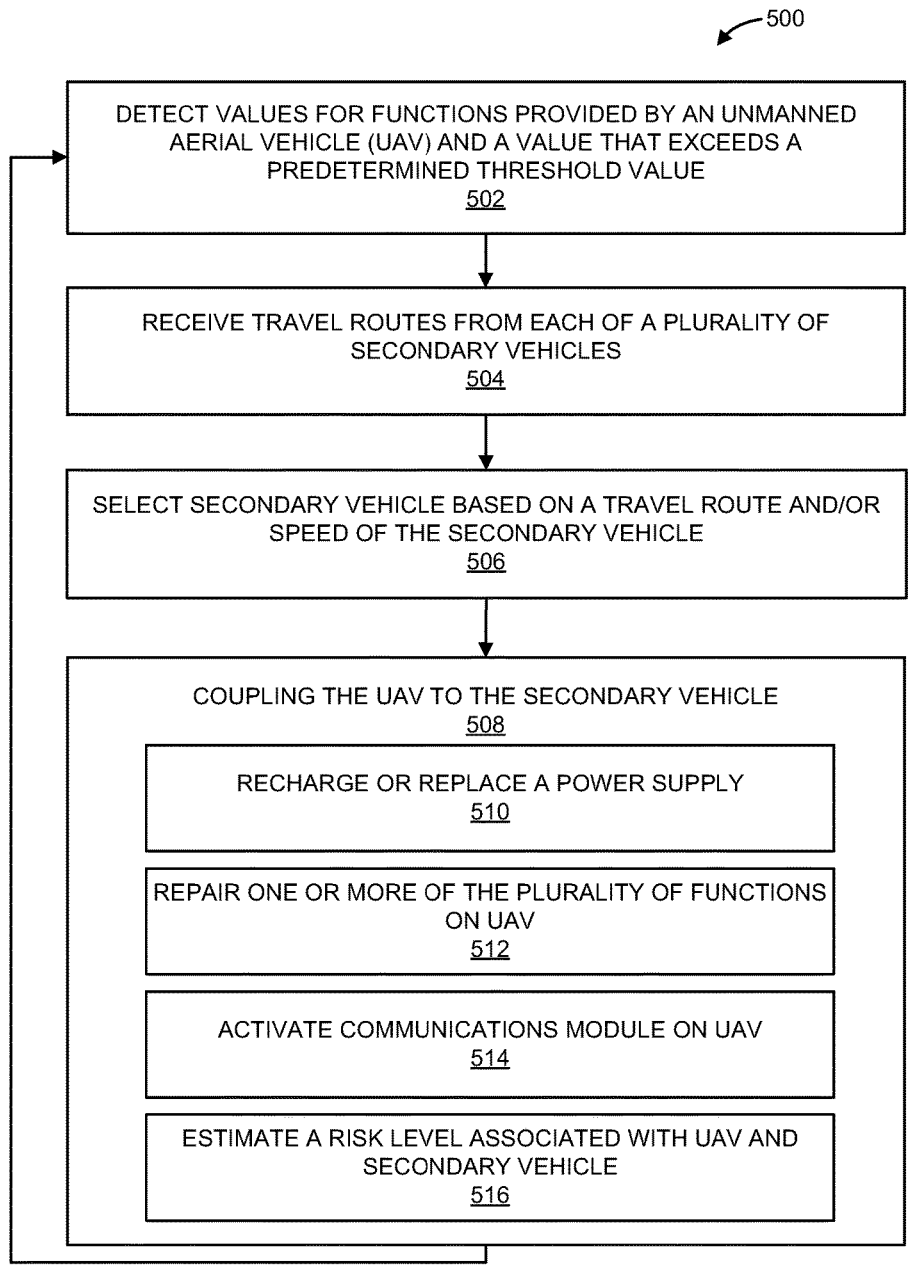
FIG. 5 is a schematic diagram of an exemplary system/method for providing drone coupling between an unmanned aerial vehicle and a secondary vehicle, in accordance with an embodiment.

Now referring to FIG. 5, with continued reference to FIGS. 1-4, FIG. 5 shows an exemplary method 500 for providing drone coupling between an unmanned aerial vehicle 102 and a secondary vehicle 130 is illustratively depicted, in accordance with an embodiment of the present principles.

In block 502, the method 500 may include detecting, by a processor-based monitoring device, values for each of a plurality of functions provided by the unmanned aerial vehicle 102 and at least one value that exceeds a predetermined threshold value. Monitoring may include monitor values for each of a plurality of functions and/or one or more components of the unmanned aerial vehicle 102 and/or secondary vehicle 130 to determine if services of the unmanned aerial vehicle 102 and/or secondary vehicle 130 are needed. For example, the monitoring may include monitoring a power supply level of the power supply 110 on the unmanned aerial vehicle 102 and/or operating status of the motor 108, movement mechanism 106, camera 112, sensor 114, etc.

When a value of a function and/or a component of the unmanned aerial vehicle 102 exceeds a predetermined threshold value, the method may include receiving travel routes from each of a plurality of secondary vehicles 130, as shown in block 504.

In block 506, the method 500 may include selecting at least one secondary vehicle 130 based on the travel route of the secondary vehicle 130 and/or speed of the secondary vehicle 130. For example, selecting at least one secondary vehicle 130 may include selecting a secondary vehicle 130 when its respective travel route is similar to the predetermined travel route of the unmanned aerial vehicle 102.

In block 508, the method 500 may include coupling the unmanned aerial vehicle 102 to the at least one secondary vehicle 130. Coupling the unmanned aerial vehicle 102 to the secondary vehicle 130 may include engaging and/or disengaging attachment devices 134 on the unmanned aerial vehicle 102 and/or secondary 130, such as latches, hooks, magnets, etc. In some embodiments, the method 500 may further include recharging or replacing the power supply 110 on the unmanned aerial vehicle 102 when the unmanned aerial vehicle 102 is coupled to the secondary vehicle 130, as illustrated in block 510. In an embodiment, the method 500 may further include repairing one or more of the plurality of functions on the unmanned aerial vehicle 102 when the unmanned aerial vehicle 102 is coupled to the secondary vehicle 130, as illustrated in block 512. In block 514, the method 500 may further include activating a communications module (e.g., transceiver 116) on the unmanned aerial vehicle 102 to provide communications for the secondary vehicle 130 when the unmanned aerial vehicle 102 is coupled to the secondary vehicle 130.

In an embodiment, the method 500 may include estimating a risk level associated with the unmanned aerial vehicle 102 and/or secondary vehicle 130, as shown in block 516. In some embodiments, estimating the risk level may include monitoring a plurality of environmental variables traversed by the unmanned aerial vehicle 102, such as rain, sleet, snow, hail, excessive wind, etc. In an embodiment, estimating the risk level may include monitoring a plurality of speeds of the secondary vehicle to estimate aerodynamic drag to the secondary vehicle 130 due to coupling the unmanned aerial vehicle 102 to the secondary vehicle 130. When the risk level exceeds a predetermined level, an instruction to disengage and/or unfasten the unmanned aerial vehicle 102 from the secondary vehicle 130 may be generated. It should be understood that the blocks of 502-516 may be continuously repeated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
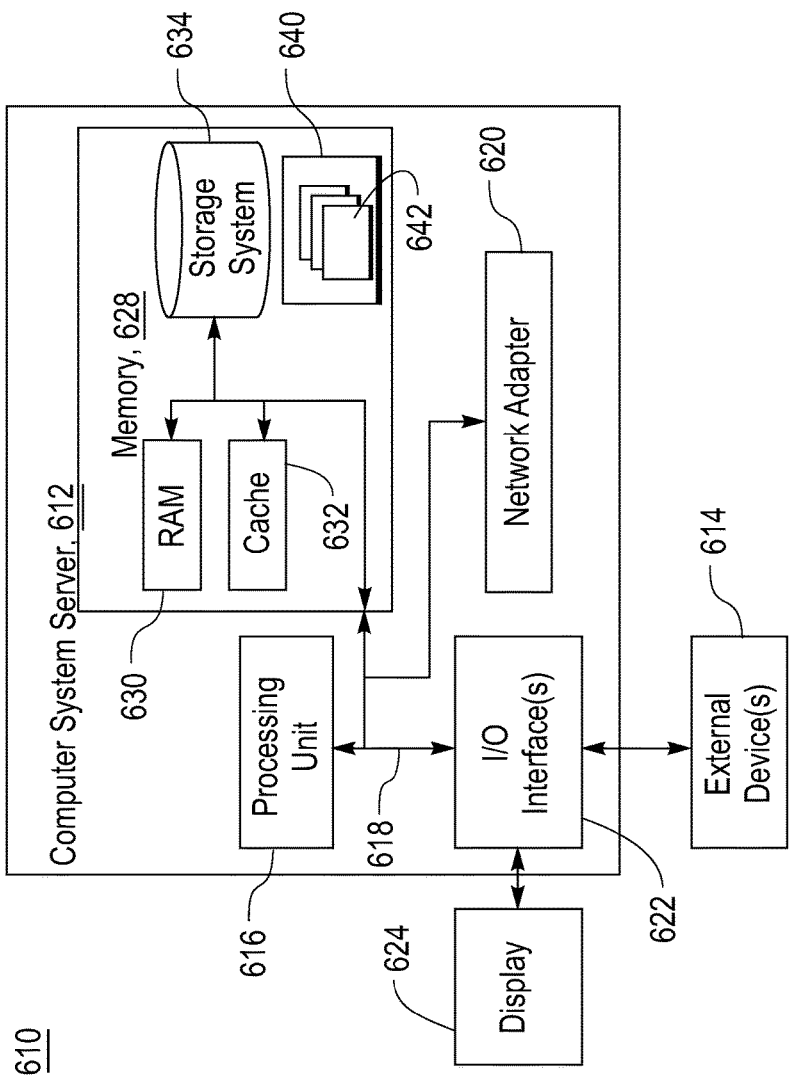
FIG. 6 is a block/flow diagram of an exemplary cloud computing node, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
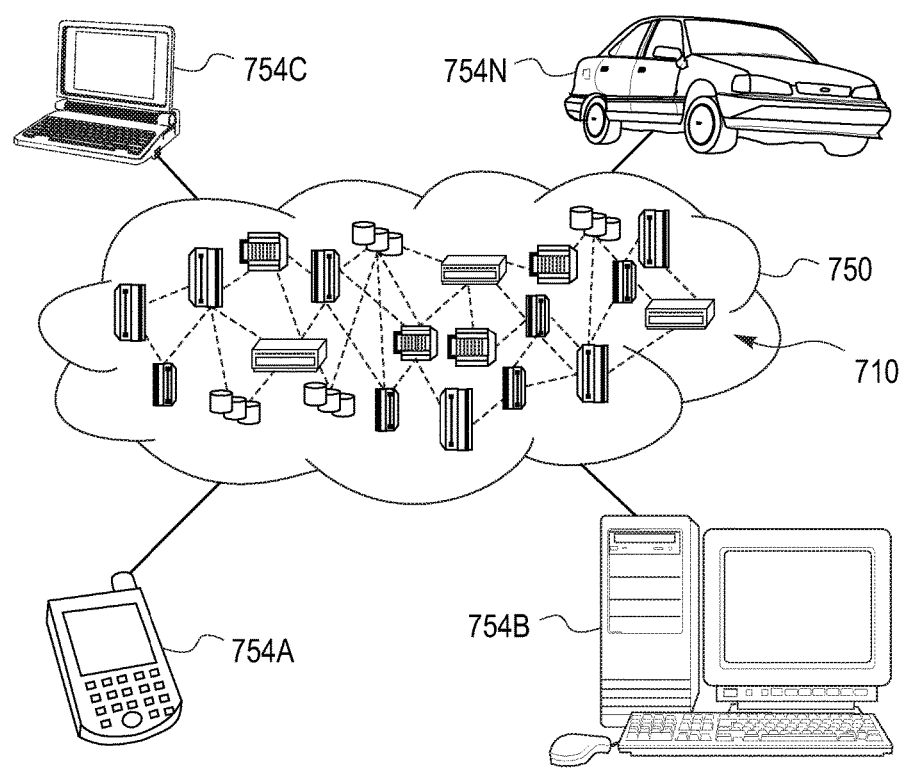
FIG. 7 is a block/flow diagram of an exemplary cloud computing environment, in accordance with an embodiment of the present principles.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
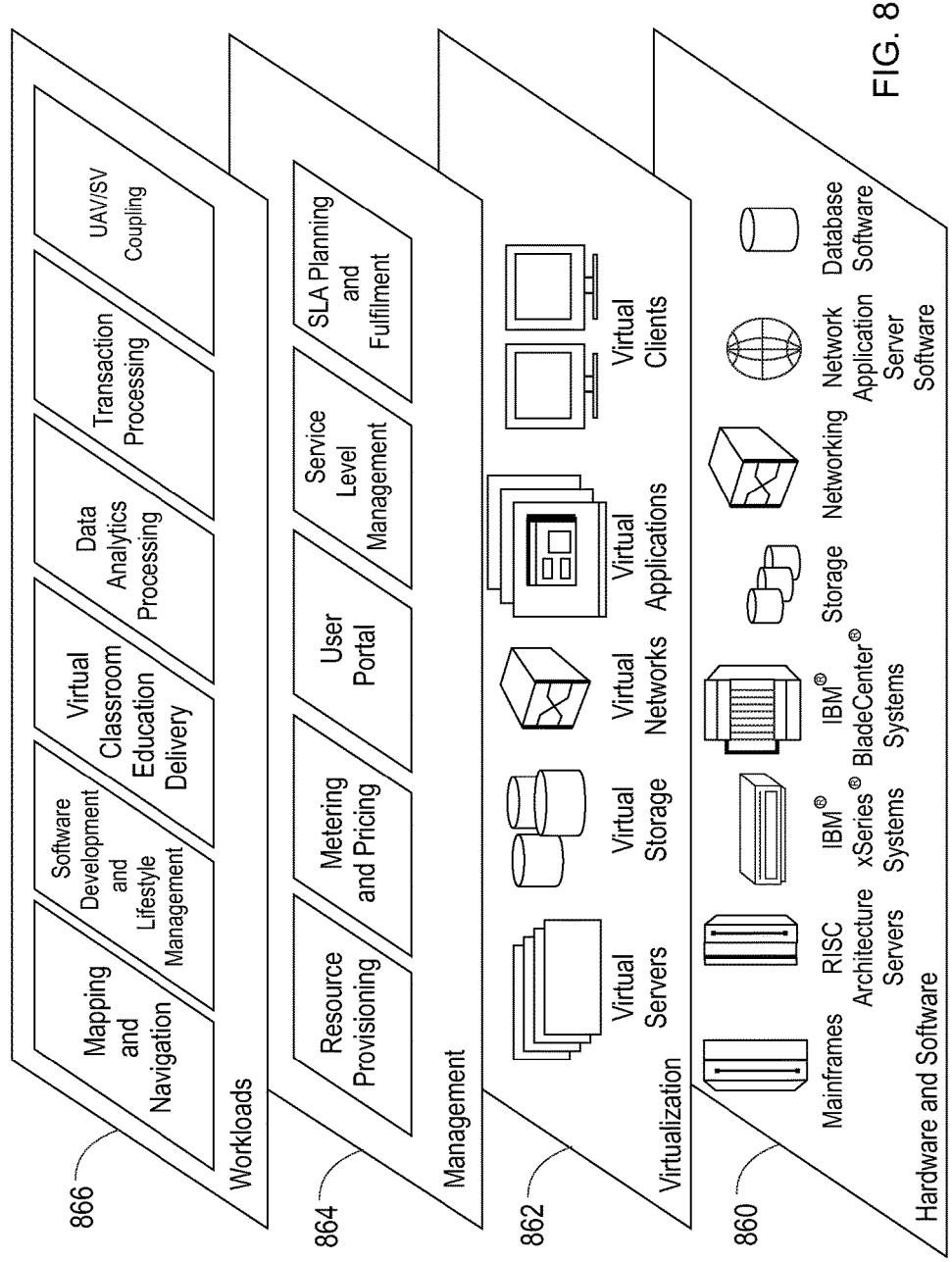
FIG. 8 is a schematic diagram of exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and unmanned aerial vehicle (UAV) and secondary vehicle (SV) coupling.

Having described preferred embodiments of an unmanned aerial vehicle for providing drone coupling between an unmanned aerial vehicle 102 and a secondary vehicle 130, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An unmanned aerial vehicle coupling apparatus, comprising: a processor-based monitoring device to monitor values for each of a plurality of functions provided by a unmanned aerial vehicle and to detect when at least one value exceeds a predetermined threshold value; a vehicle selector to receive travel routes and an availability of a secondary vehicle to perform services concerning the at least one value that exceeds the predetermined threshold from each of a plurality of secondary vehicles and to select at least one secondary vehicle based on a travel route of the at least one secondary vehicle and the availability of the secondary vehicle to perform the services concerning the at least one value that exceeds the predetermined threshold when the at least one value exceeds the predetermined threshold value; a coupling mechanism to fasten and unfasten the unmanned aerial vehicle to the at least one secondary vehicle, and a risk assessment device configured to estimate a risk level associated with each of the unmanned aerial vehicle and secondary vehicle; wherein the risk assessment device generates an instruction to the coupling mechanism to unfasten the unmanned aerial vehicle when the risk level associated with each of the unmanned aerial vehicle and secondary vehicle exceeds a predetermined level.

2. The apparatus of claim 1, further comprising a recharging device to recharge or replace a power supply on the unmanned aerial vehicle when the unmanned aerial vehicle is fastened to the at least one secondary vehicle.

3. The apparatus of claim 1, further comprising a repair device to repair one or more of the plurality of functions on the unmanned aerial vehicle when the unmanned aerial vehicle is fastened to the at least one secondary vehicle.

4. The apparatus of claim 1, further comprising one or more user input components to activate a communications module on the unmanned aerial vehicle to provide communications for the at least one secondary vehicle when the unmanned aerial vehicle is fastened to the at least one secondary vehicle.

5. The apparatus of claim 1, wherein the risk assessment device monitors a plurality of environmental variables traversed by the unmanned aerial vehicle to estimate the risk level, the plurality of environmental variables being selected from the group consisting of rain, sleet, snow, hail, and excessive wind.

6. The apparatus of claim 1, wherein the risk assessment device monitors a plurality of speeds of the secondary vehicle to estimate aerodynamic drag to the at least secondary vehicle.

7. A method for providing drone coupling, the method comprising: detecting, by a processor-based monitoring device, values for each of a plurality of functions provided by a unmanned aerial vehicle and at least one value that exceeds a predetermined threshold value; receiving via a vehicle selector, travel routes and an availability of a secondary vehicle to perform services concerning the at least one value that exceeds the predetermined threshold from each of a plurality of secondary vehicles; selecting via the vehicle selector, at least one secondary vehicle based on a travel route of the at least one secondary vehicle and the availability of the secondary vehicle to perform the services concerning the at least one value that exceeds the predetermined threshold when the at least one value exceeds the predetermined threshold value; coupling via a coupling mechanism, the unmanned aerial vehicle to the at least one secondary vehicle; and estimating via a risk assessment device, a risk level associated with each of the unmanned aerial vehicle and secondary vehicle; generating via the risk assessment device, an instruction to unfasten the unmanned aerial vehicle when the risk level associated with each of the unmanned aerial vehicle and secondary vehicle exceeds a predetermined level.

8. The method of claim 7, further comprising recharging or replacing a power supply on the unmanned aerial vehicle when the unmanned aerial vehicle is coupled to the at least one secondary vehicle.

9. The method of claim 7, further comprising repairing one or more of the plurality of functions on the unmanned aerial vehicle when the unmanned aerial vehicle is coupled to the at least one secondary vehicle.

10. The method of claim 7, further comprising activating a communications module on the unmanned aerial vehicle to provide communications for the at least one secondary vehicle when the unmanned aerial vehicle is coupled to the at least one secondary vehicle.

11. The method of claim 7, wherein estimating the risk level includes monitoring a plurality of environmental variables traversed by the unmanned aerial vehicle, the plurality of environmental variables being selected from the group consisting of rain, sleet, snow, hail, and excessive wind.

12. The method of claim 7, wherein estimating the risk level includes monitoring a plurality of speeds of the secondary vehicle to estimate aerodynamic drag to the at least secondary vehicle.

13. A non-transitory computer readable storage medium comprising a computer readable program for providing drone coupling, wherein the computer readable program, when executed on a computer, causes the computer to execute: detecting, by a processor-based monitoring device, values for each of a plurality of functions provided by a unmanned aerial vehicle and at least one value that exceeds a predetermined threshold value; receiving via a vehicle selector, travel routes and the availability of a secondary vehicle to perform services concerning the at least one value that exceeds the predetermined threshold from each of a plurality of secondary vehicles; selecting via the vehicle selector, at least one secondary vehicle based on a travel route of the at least one secondary vehicle and the availability of the secondary vehicle to perform the services concerning the at least one value that exceeds the predetermined threshold when the at least one value exceeds the predetermined threshold value; and coupling via a coupling mechanism, the unmanned aerial vehicle to the at least one secondary vehicle; and estimating via a risk assessment device, a risk level associated with each of the unmanned aerial vehicle and secondary vehicle; generating via the risk assessment device, an instruction to unfasten the unmanned aerial vehicle when the risk level associated with each of the unmanned aerial vehicle and secondary vehicle exceeds a predetermined level.

14. The non-transitory computer readable storage medium of claim 13, further comprising recharging or replacing a power supply on the unmanned aerial vehicle when the unmanned aerial vehicle is coupled to the at least one secondary vehicle.

15. The non-transitory computer readable storage medium of claim 13, further comprising activating a communications module on the unmanned aerial vehicle to provide communications for the at least one secondary vehicle when the unmanned aerial vehicle is coupled to the at least one secondary vehicle.

\* \* \* \* \*